(12) United States Patent
Cook

(10) Patent No.: US 9,098,632 B2
(45) Date of Patent: Aug. 4, 2015

(54) COMPUTER PROGRAM TESTING

(75) Inventor: Duncan Cook, Farnborough (GB)

(73) Assignee: DCS CONSULTANCY SERVICES LIMITED, Farnborough (GB)

(*) Notice: Subject to any disclaimer, the term of this patent is extended or adjusted under 35 U.S.C. 154(b) by 1080 days.

(21) Appl. No.: 12/959,794

(22) Filed: Dec. 3, 2010

(65) Prior Publication Data

US 2012/0144373 A1 Jun. 7, 2012

(51) Int. Cl.
G06F 9/44 (2006.01)
G06F 11/36 (2006.01)

(52) U.S. Cl.
CPC .............. *G06F 11/3684* (2013.01); *G06F 8/38* (2013.01); *G06F 11/368* (2013.01); *G06F 11/3668* (2013.01)

(58) Field of Classification Search
None
See application file for complete search history.

(56) References Cited

U.S. PATENT DOCUMENTS 8,185,877 B1 * 5/2012 Colcord ................. 717/127

* cited by examiner

*Primary Examiner* — Lewis A Bullock, Jr.
*Assistant Examiner* — Mark Gooray
(74) *Attorney, Agent, or Firm* — EIP US LLP

(57) ABSTRACT

Systems, methods and computer-executable instructions for testing computer programs are provided. A computer program (application under test—AUT) is analyzed and data records are created for each user interface object of each screen of the AUT. The data records form a dataset which may be copied and edited to define a series of test functions to be performed on the AUT. Corresponding test code is provided to perform the test functions, the test code referencing the data records of the dataset.

18 Claims, 7 Drawing Sheets

COMPUTER PROGRAM TESTING

FIELD OF THE INVENTION

The present invention relates to systems and methods for testing a computer program and in particular for automatically testing a computer program which provides a graphical user interface.

BACKGROUND

Front end applications are computer programs which typically provide a Graphical User Interface (GUI) through which a user may interact with the application. The use of a GUI is well established in the computing field, and is used in the control of operating systems, text editing applications and calculation applications among many others.

The GUI of an application is designed to show a number of screens. A screen may comprise a window or dialogue box displayed on a part of a visual display unit (VDU), or alternatively a screen may occupy the whole of a VDU. These screens each contain a set of GUI objects; a GUI object is anything in the screen which may be interacted with by the user. For example, a screen of a front end application may comprise the "Save As . . ." dialogue box, in which the "Save" button, "Cancel" button, "Save As Type" drop down menu, "File Name" text entry box all constitute GUI objects. In addition, the screen itself, i.e. the dialogue box, constitutes a GUI object which contains parameters such as the name, class, size and position of the screen (dialogue box).

When an application is being developed it is customary to test the application to ensure that the application is working correctly. This testing is intended to uncover defects or "bugs" in the application. The defects may arise from both architectural error (that is an error in the specification of the application) and programming error (a mistake in the writing of the application's computer code).

Any such test will emulate a user interacting with the GUI objects of the application under test (AUT). To do this the test will define a series of actions to be performed on the GUI objects and the expected results of such actions. To give an example, a test may define that the close button of a particular window be clicked, the expected result being the closing of the window.

A first type of application test is called a manual test. A manual test is derived from the AUT's requirements and will be written by one or more of a manual tester, a Subject Matter Expert (SME), or a Business Analyst (BA) who has knowledge of the AUT. To create a manual test a series of user actions and verification steps are documented in chronological order. These manual test actions may include specifying that a particular button is to be clicked using the mouse, or that certain text is to be inputted on the keyboard. To test an AUT using a manual test, a human tester has to perform each step as if that tester were a user. In addition the tester has to confirm that the expected results defined in the verification steps have been achieved. A manual test has the disadvantage that the tester has to be present to perform the test, increasing the cost and time of performing a test on an application.

A further type of application test is an automated test. In an automated test, the actions and verifications of the manual test are performed by a computer emulating the human tester. Automated tests are normally derived from manual tests; that is, a manual test is defined by the manual tester, SME and/or BA and then the steps of the manual test are used by a programmer as a basis for creating the automated test. The process of creating an automated test is more laborious than a manual test, and consequently not all manual tests are converted into automated tests.

An automated test script may be created using an automation technology. Each automation technology may use a scripting language to describe the recorded steps in a computer understandable form. Examples of such automation technologies and their scripting languages (in brackets) are:

| | |
|---|---|
| Hewitt Packard, QuickTest Professional | (Visual Basic Script) |
| IBM Rational, IBM Rational Functional Tester | (Java or Visual Basic) |
| IBM Rational, Rational robot | (Java or Visual Basic) |
| Micro Focus, SilkTest | (Visual Basic, .Net or C#) |

To create an automated test from a manual test using an automation technology the following operations need to be performed:

Baselining

The tester performs the actions on the AUT defined in a manual test while the automation technology 'records' these steps. In recording the steps, the automation technology generates a 'baseline script' of computer code. The code in the baseline script uniquely identifies a GUI object in a screen and identifies an action to be performed on this object. The baseline script is then modified, as described below, to form the final automated test script.

Specifying Synchronization Points

When a given test action is performed, the GUI displayed by the AUT will change in response to the test action. This change must occur before any subsequent test action is performed. For example, when a "Login" button is clicked (assuming correct login details), an AUT may be programmed to replace a login window with a welcome screen. When the next action to be performed by the test is to an object in this welcome screen, the test must first ensure that the AUT is displaying the correct screen and is therefore ready for this next action; that is, the test needs to 'synchronize' with the AUT. During a manual test, the human tester will instinctively wait for the new screen to appear before attempting the next action—a human tester will instinctively synchronize with the AUT. However a computer running an automated test script needs to be programmed to do so.

Consequently, synchronization points are defined within the test script code. To do this, the baseline script is replayed and it is determined where the automated test script needs to perform synchronizations. The code within the baseline script is then modified to include synchronization code which explicitly defines the synchronization requirements. Typically, the synchronization code will define a period during which the test waits, and a result (such as the appearance of the welcome screen) which is to be tested for during that time.

Defining Verification Checkpoints

The manual test defines the expected result of each action. Corresponding verification code therefore needs to be included into the automated test script. The verification code defines verification checkpoints which are points in the execution of the code at which a comparison between the expected response of the AUT and the actual response of the AUT is made. The verification code defines both the test, and code to report both success and failure.

Script Testing

The final automated test script is replayed to check that the script code is of valid syntax and will provide valid responses for both pass and failure conditions of the application.

As can be seen, the process by which a manual test is converted into an automated test is laborious. As a result, not all manual tests are automated. In addition, new versions of the AUT will be periodically released. Each new version will be a modified version of the previous one. The modifications may correct defects; alternatively the modifications may add new features to the AUT. Each new version of the AUT may require an automated test script to be re-recorded (with the corresponding steps as defined above). This can further increase the labour required to test an application.

In addition, any changes to a test script need to be defined within the scripting code. This requires specialist knowledge of the scripting code being used, knowledge which may not be available to a subject matter expert defining the test. Consequently, an expert in scripting is required to bridge this gap.

Therefore there is a need for a system in which manual tests can be readily automated. There is a further requirement for a system in which an automated test can be readily edited by a person lacking expert knowledge of scripting systems. Moreover, there is a need for a system in which existing automated tests can be easily updated to reflect the modifications to the AUT.

SUMMARY OF THE INVENTION

In accordance with at least one embodiment of the invention, methods, devices, systems and software are provided for supporting or implementing functionality to enable the testing of a computer program, as specified in the independent claims.

This is achieved by a combination of features recited in each independent claim. Accordingly, dependent claims prescribe further detailed implementations of the present invention.

According to a first aspect of the invention there is provided a computer implemented method of generating a test script template for a computer program, the computer program comprising a set of instructions which, when executed on a computer, causes the computer to display a user interface comprising a set of screens, each screen of the set of screens comprising user interface objects, the method comprising: receiving data identifying the set of screens; automatically generating a first set of data records, the first set of data records comprising data records corresponding to respective user interface objects associated with each screen in the identified set of screens, and each data record comprising parameters associated with the respective user interface object; and creating a test script template comprising the first set of data records and an associated set of programming instructions, wherein the programming instructions reference the data records.

Since the system generates the first set of data records for each set of the user interface objects and creates a test script template comprising the first set of data records and an associated set of programming instructions, the system is able to generate a template which can be conveniently used to create many automated test scripts simply by copying and editing the copy of the first set of data records (in particular since the each user interface object each set has a data record created). By contrast the prior art the automated test needs to be re-recorded for each new test.

Each one of the set of screens may comprise a user interface object comprising parameters of the screen. That is, the parameters of the screen, such as identity, class position, height, width etc. . . . form a GUI object associated with the screen, from which a corresponding data record is created. The first set of data records may comprise one data record for each user interface object associated with each screen of the set of screens. The method may comprise receiving a plurality of inputs, each input identifying one screen of the set of screens; and in response to each input automatically generating data records for each of the plurality of user interface objects associated with the screen identified in the input. The method may further comprise providing input to the computer program whereby to cause the computer program to display the plurality of screens.

The computer program may be a first version of an application and the first version may be modified to create a second version thereof, the second version comprising at least one modification when compared to the first version, the method may comprise: receiving data identifying one or more screens, the one or more screens comprising the at least one modification; generating at least one further data record for at least one user interface object of the one or more identified screens; and modifying the first set of data records by combining the at least one further data record with one or more of the data records of the first set of data records.

Advantageously, when a computer program is modified (i.e. version 2 etc is released) then the received input need only to identify one or more screens, the one or more screens comprising the at least one modification. Consequently the generating at least one further data record need only be performed for the modifications. As a result, the first set of data records is more easily updated to reflect the modifications. By contrast, the existing automated test systems require at least some of the test to be re-recorded.

The generating at least one further data record may comprise generating a data record for each user interface object of the identified one or more screens.

The at least one modification may comprise at least one of: an additional screen; removal of a screen from the set of screens; an additional user interface object associated with a screen; removal of a user interface object from the set of GUI objects associated with a screen; and a modified user interface object associated with a screen.

According to a second aspect of the present invention, there is provided a computer implemented method of generating a test script for a computer program, the computer program comprising a set of instructions which, when executed on a computer, causes the computer to display a user interface comprising a set of screens, each screen of the set of screens comprising user interface objects, the method comprising: selecting a subset of data records from a first set of data records, each data record corresponding to a respective user interface object of the set of screens of the computer program and each data record comprising parameters associated with the respective user interface object; defining an order for the data records of the subset; associating at least one test function with each of the data records of the subset whereby to create a test dataset from the ordered subset and the associated test functions; and creating a test script, the test script comprising information identifying the test dataset and a set of programming instructions, wherein the set of programming instructions are associated with each of the data records of the subset, and reference the parameters of the data records and the test functions associated with the data records.

By creating a test dataset the parameters can be kept separate from the programming instructions, thereby simplifying the writing of the test script. In addition, by selecting a subset of the first set of data records whereby to create the test dataset the user defining the test requires less knowledge of the system since firstly the information in the data records is provided, and do not have to be created by the user, and secondly the user is not required to edit computer code.

The first set of data records may comprise data records comprising parameters of each of the screens. That is, the screen itself may be treated as a user interface object, and may have a test function associated with it.

The test function may comprise one or more of: an action, a verification and a synchronization. The test function may be defined by one or more of: information identifying an action to be performed; information identifying an expected property to be verified; synchronization property; a synchronization value; and a synchronization timeout.

The data records of the first set of data records may comprise information identifying a plurality of functions associated with the respective user interface object, and the associating at least one test function with a data record may comprise selecting one of the plurality of functions and associating said selected function with the data record.

By choosing one of a plurality of functions, the creation of the dataset and thus the test script is easier. For example the menu object may have a plurality of actions which can be performed by interacting with the menu object (for example, open, close, print, etc.). The data record may contain a list of all these functions, and one may be selected from this list to form a test function.

Creating a dataset may comprise modifying the object parameters of at least one of the data records. By changing the parameters, the dataset and therefore the test script can verify or check parameters differing from those when the data record was originally created. For example, a login name can be changed.

The computer program may be a first version and the first version may be modified to create a second version, the second version comprising at least one modification when compared to the first version, the method may comprise: selecting at least one data record from a second set of data records associated with the second version; creating a second test dataset associated with the second version, the second test dataset being created by modifying the test dataset associated with the first version to include the at least one selected data record.

In contrast to the prior art where the whole script needs to be created, the method above requires only the modified data records to be selected and incorporated into the script, thus simplifying the process when many versions of the computer program are created/exist.

Creating a second test dataset may comprise modifying the test dataset associated with the first version to remove at least one data record, modifying the test dataset associated with the first version may be dependent on a determining that the test dataset associated with the first version comprises an one or more data records associated with the at least one modification. Therefore, only when a new dataset needs to be created (i.e. if a change has been made affecting the components of the dataset) is the new dataset created, thus making the process more efficient.

The computer program may comprise a plurality of versions, each version being a modification of a previous version, and a dataset may be created for a version of the computer program only if the test dataset associated with the previous version comprises a data record associated with a modification from the previous version.

Only when a new dataset needs to be created (i.e. if a change has been made affecting the steps in the dataset) is the new dataset created, thus making the process more efficient.

According to a third aspect of the present invention, there is provided a computer implemented method of testing a computer program, the computer program comprising a set of instructions which, when executed on a computer, causes the computer to display a user interface comprising a set of screens, each screen of the set of screens comprising user interface objects, the method comprising: receiving data identifying a test script, the test script being associated with the computer program; identifying, using the identified test script, a test dataset, the test dataset comprising a plurality of data records, each data record corresponding to a respective user interface object of the computer program and each data record comprising object parameters associated with the respective user interface object, the test dataset further comprising information defining an order for the plurality of data records, and at least one test function associated with each of the plurality of data records; and identifying computer programming instructions associated with each of the data records in the selected test dataset; and executing the identified programming instructions in an order based on the defined order of the data records in the dataset, wherein the identified programming instructions reference the object parameters and the at least one test function associated with the data record whereby to test the computer program.

By identifying the test dataset which holds the ordered data records and then executing identified programming instructions in the order defined in the test dataset the system is able to run fully automated test scripts, while the user is only required to define the test dataset.

The test dataset may comprise data records comprising parameters of at least one of the screens. That is, the screen itself may be treated as a user interface object, and may have a test function performed on it.

The computer program may comprise a plurality of versions, each later version being a modification of a prior version, and a test dataset may created for a later version of the computer program only if the test dataset associated with the prior version comprises a data record associated with a modification from the previous version, and the identifying the dataset may comprise: determining a latest one of the plurality of versions for which a test dataset has been created, wherein the identified test dataset is the dataset associated with said determined version.

Therefore, when a computer program is modified, the test datasets are only modified if they need to be (i.e. if they contain data records associated with user interface objects which have been modified). Consequently, by determining the latest one of the plurality of versions for which a test dataset has been created, the method is able to automatically identify the relevant dataset and correctly test the computer program.

According to a fourth aspect of the present invention there is provided a computer readable storage medium storing computer readable instructions thereon for execution on a computing system to implement a method of generating a test script template for a computer program, the computer program comprising a set of instructions which, when executed on a computer, causes the computer to display a user interface comprising a set of screens, each screen of the set of screens comprising user interface objects, the method comprising: receiving data identifying the set of screens; automatically generating a first set of data records, the first set of data records comprising data records corresponding to respective user interface objects associated with each screen in the identified set of screens, and each data record comprising parameters associated with the respective user interface object; and creating a test script template comprising the first set of data records and an associated set of programming instructions, wherein the programming instructions reference the data records.

According to a fifth aspect of the present invention there is provided a computer readable storage medium storing computer readable instructions thereon for execution on a computing system to implement a method of testing a computer program, the computer program comprising a set of instructions which, when executed on a computer, causes the computer to display a user interface comprising a set of screens, each screen of the set of screens comprising user interface objects, the method comprising: receiving data identifying a test script, the test script being associated with the computer program; identifying, using the identified test script, a test dataset, the test dataset comprising a plurality of data records, each data record corresponding to a respective user interface object of the computer program and each data record comprising parameters associated with the respective user interface object, the test dataset further comprising information defining an order for the plurality of data records, and at least one test function associated with each of the plurality of data records; identifying computer programming instructions associated with each of the data records in the selected test dataset; and executing the identified programming instructions in accordance with the defined order of the data records in the dataset, wherein the identified programming instructions reference the parameters and the at least one test function associated with the data record whereby to test the computer program.

According to a sixth aspect of the present invention there is provided a system for testing a computer program, the computer program comprising a set of instructions which, when executed on a computer, causes the computer to display a user interface comprising a set of screens, each screen of the set of screens comprising user interface objects, the system configured to: receive data identifying the set of screens; automatically generate a first set of data records, the first set of data records comprising data records corresponding to respective user interface objects associated with each screen in the identified set of screens, and each data record comprising parameters associated with the respective user interface object; receive input, the input identifying a subset of data records from the first set of data records, defining an order for the data records of the subset, and identifying at least one test function to be associated with each of the data records of the subset whereby to create a test dataset from the ordered subset and the associated test functions; identify computer programming instructions associated with each of the data records in the selected test dataset; and execute the identified programming instructions in accordance with the defined order of the data records in the dataset, wherein the identified programming instructions reference the parameters and the at least one test function associated with the data record whereby to test the computer program.

Further features and advantages of the invention will become apparent from the following description of preferred embodiments of the invention, given by way of example only, which is made with reference to the accompanying drawings.

BRIEF DESCRIPTION OF THE DRAWINGS

A method of testing a computer program will now be described as an embodiment of the present invention, by way of example only, with reference to the accompanying figures in which.

DETAILED DESCRIPTION

Figure 1:
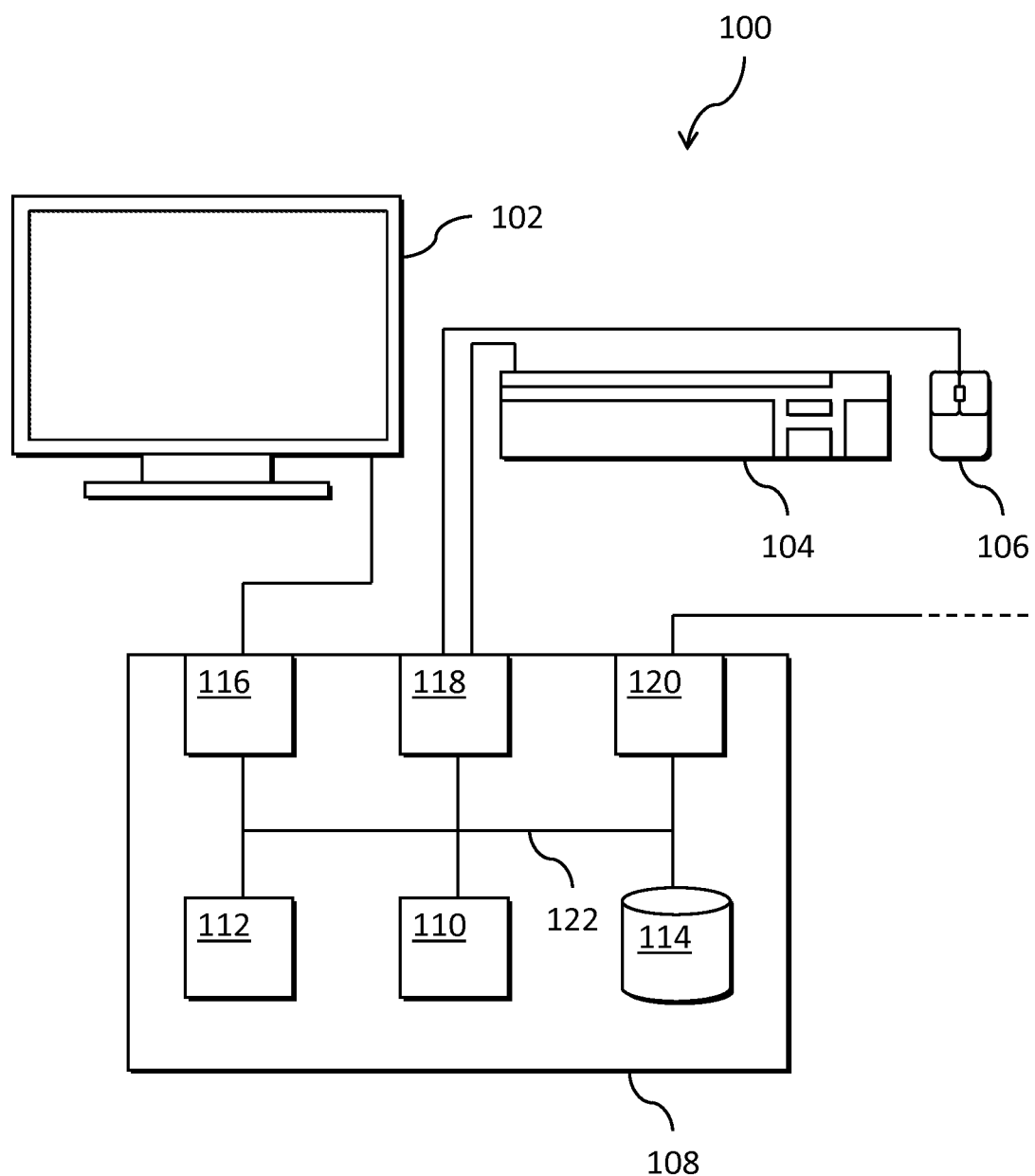
FIG. 1 shows a computer system in which embodiments of the invention may be realized.

A system 100 in which embodiments of the invention may be realized will now be described with reference to FIG. 1. The system 100 comprises a visual display unit (VDU) such as an LCD screen 102, and user input devices such as a keyboard 104 and mouse 106. In some embodiments, the user input devices may be incorporated into the VDU, such as in a touch screen. The screen 102, keyboard 104 and mouse 106 are all connected to a computer 108. The computer 108 comprises a central processing unit (CPU) 110, a volatile memory 112 (such as RAM), non-volatile memory 114 (such as a hard drive), a graphical processing unit (GPU) 116 which provides an output for the screen 102, an I/O unit 118 (such as a USB interface) which provides a connection to the keyboard and mouse, and a network unit 120 such as an Ethernet or WiFi module which provides a network connection. All are interconnected via connection 122 which may comprise one or more direct connections and/or a bus.

The above described system is purely exemplary and the system may be augmented with, for example, dedicated hardware units and the like, all of which are well known in the art of computer hardware. Equally, parts of the described system may be optional, for example the non-volatile memory 114 may be absent and applications and other data may be stored on a network attached storage system. The system may be a standalone system as shown, an all-in-one system (such as a laptop) or a thin client connected to a central server. All are well known in the art, and will not be described further.

In one embodiment, the non-volatile memory 114 stores computer programming instructions which include one or more versions of the AUT and embodiments of the present invention (henceforth "scripting application") for testing the AUT. When the AUT is executed on the computer system 100, the AUT causes a number of screens to be displayed on the screen 102, examples of these screens will be described with reference to FIGS. 2a and 2b.

Figure 2A:
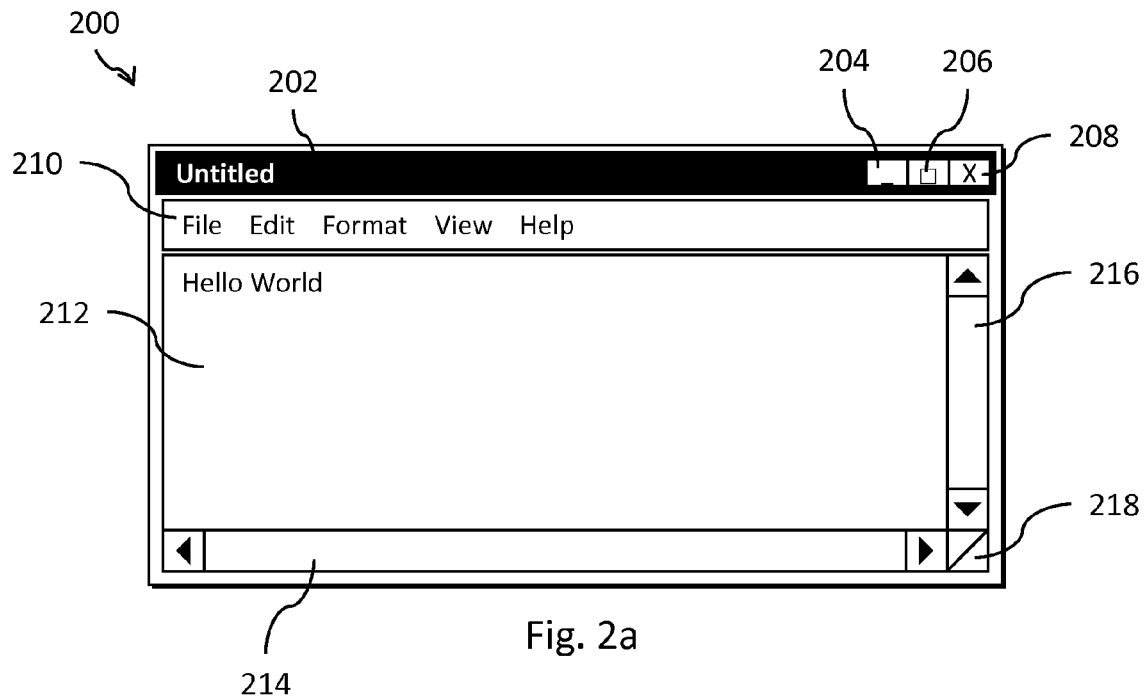
FIGS. 2a and 2b show examples of screens which may be displayed by a front end application.
Figure 2B:
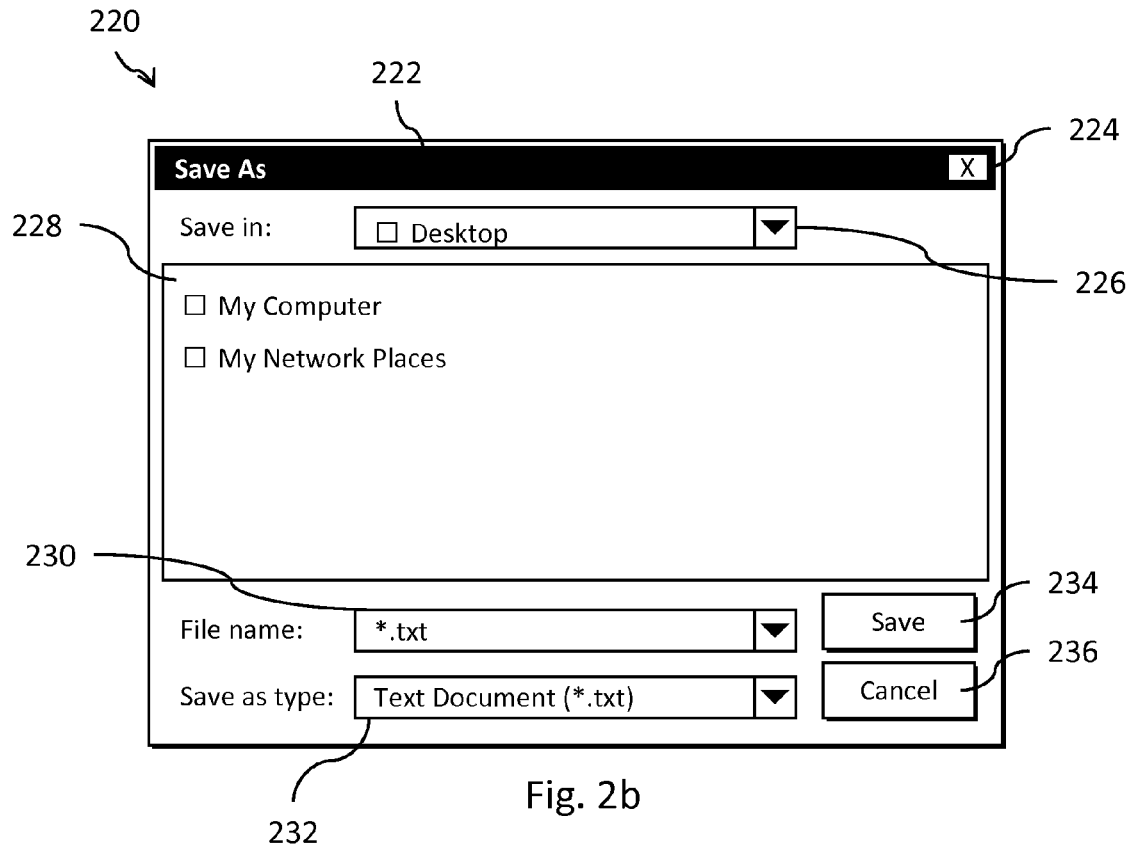

FIGS. 2a and 2b show examples of screens which may be displayed by an AUT. The illustrated screens are displayed by the "Notepad" application installed on many computers running the Windows operating system. FIG. 2a shows the main window 200 of the Notepad application. Within the main window is a title bar 202; minimize, maximize and close boxes 204, 206 and 208 respectively; a menu portion 210; a text editing box 212 (containing the text "Hello World"); horizontal and vertical scroll bars 214 and 216; and finally a resize tab 218.

FIG. 2b shows a "Save as" dialogue box 220 which may be displayed by the Notepad application when a user saves a text file for the first time. Similar to the main window 200 described above, the "Save as" dialogue box has a title 222 and close button 224. In addition the "Save as" dialogue box has a "Save in" drop down menu 226; a save in selection box 228; "File name" and "Save as type" drop down menus 230 and 232 respectively; an "Save" button 234; and a "Cancel" button 236.

Each of the main window 200 and dialogue box 220 constitute a screen of the notepad application. Associated with each of these screens are a number of GUI objects. A first GUI object associated with the screen contains the parameters (such as title, position and size) of the screen itself; in other words, the screen itself is a GUI object. In addition, each of the features referenced above (204, 206, 208 etc. . . . ) constitutes a GUI object. Finally, a screen may contain hidden objects (not shown in the Figures) which while not visible to a user exist within the screen. The visibility of the hidden objects may change, for example in response to a stored parameter within the AUT or a user input.

Each GUI object has a number of properties, these properties include (but are not limited to): information identifying the object (including the name and class of the object, the screen in which the object is located and/or the owner of the object); information identifying the actions which may be performed on the object (for example a button can be clicked, and a drop down box may have an item selected from it); information identifying items within the object (for example a menu object may have a "File" and "Edit" menus within it, each with their own items, for example "Open", "Save", "Cut" "Copy" etc. . . . ); and information identifying other properties of the object, such as position, size etc. . . .

Any application under test (AUT) may have a number of versions. Each version will contain modifications when compared to the previous version. These modifications may have been made to correct a defect in the previous version; alternatively or additionally, the modifications may have been made to provide additional functionality to the system. In terms of testing, the modifications can result in one or more of the following changes to the AUT: additional screen(s) may be added; one or more screens may be removed; GUI objects may be added to and/or removed from an existing screen; and existing GUI objects may be modified.

In accordance with embodiments of the invention, a two step process is used to create a test for an AUT. In the first step, the AUT is analysed to produce a master dataset. The master dataset contains a series of data records, each data record corresponding to a GUI object of the AUT. The master dataset, in combination with a test code file, and optionally an access file template, forms a test script template from which an automated test script can be created.

In the second step, an automated test script is created from the test script template. This is done by selecting a subset of data records from the master dataset and defining an order for the data records within the subset. The data records of the subset are combined with (or edited to include) information defining test functions associated with the data record and thus the GUI object. The subset, in combination with the associated test functions, forms a test dataset.

Within the test dataset, the order of the data records serves to define an order in which test functions (acting on the associated GUI object) are to be executed. The programming instructions for the automated test script are provided within the test code file, and reference the data within the data records of the subset to derive parameters to be used in the execution of this code.

In addition to the creation of a test dataset, an access file may be created from the access file template. This access file provides a means of accessing the automated test. That is, the access file provides a means of identifying and executing the test, and when executed, provides a means of identifying the test dataset and the associated test code file so that the test can be run.

Thus the specifics of the test (that which defines what test functions are performed on what GUI objects) are provided in the test dataset and the machine executable programming code is provided in the test code file. Furthermore the test can be accessed, that is selected and executed by a tester, through the access file.

A modification of this two step process can be used to create an updated master dataset and updated automated test scripts to reflect changes in a later version of the AUT. When an AUT is modified, a new master dataset is created based on the previous version's master dataset and a set of new data records associated with the modifications to the AUT. In addition, the test datasets created to define tests for the previous version of the AUT can be updated or otherwise modified to include the new data records (if required), and therefore define an appropriate test for the new version of the AUT.

When the new master dataset is created for the latest version, the test code file may additionally be updated to reflect the changes to the master dataset.

The access file, created when a new test is defined, does not need to be updated when a new version of the AUT is provided, since it provides a means of accessing the test dataset, rather than defining the test itself. In other words a test created, for example, to emulate a login for a first version of an AUT (v.1), would still be required to emulate the login for a second version of the AUT (v.2). However, while the test dataset for v.1 and v.2 may be different to reflect changes in the AUT, to the tester, the test ("emulate login") would still be the same. The access file may be arranged to automatically select the latest available version of the test dataset and corresponding test code file.

The master dataset created by embodiments of the invention stores information related to the GUI objects of the AUT. In particular, one data record is created for each GUI object of the AUT. Thus the master dataset comprises a comprehensive collection of the GUI objects of the AUT. In this exemplary embodiment the master dataset is specified in a spreadsheet table. Each line in the table corresponds to a data record and thus to a GUI object. Within the spreadsheet, a first set of columns serves to hold data identifying the GUI object, while a further set of columns contain property information of the GUI object. A number of additional columns are also created which are used when defining a test based on the master dataset, these columns contain ordering information and test function information. Examples of the column headings which are used in an exemplary embodiment are as follows:

Ordering Information:
ReplayIndex—an identifier defining an order for the data records such as an integer or index.

Test Function Information:
PerformAction—a flag used to indicate that the test function is an action.
PerformVerification—a flag used to indicate that the test function is a check or verification.
PerformSync—a flag used to indicate that the test function is a synchronization.
Input—defines an input for a test function.
Output—defines an output for a test function.
SyncProperty—defines a type of a parameter used in the synchronization (i.e. a text string, whether an object is visible etc. . . . ).
SyncValue—defines a parameter of the type SyncProperty to be used in the synchronization.

SyncTime—defines the wait period or timeout for synchronization.

GUI Object Identity Information:

OwnerClass & OwnerName—information identifying the owner of the GUI object.

ParentClass & ParentName—information identifying the parent of the GUI object.

ObjectClass & ObjectName—information identifying the name and class of the GUI object.

Property Information:

The following sets out an exemplary, non limiting, list of properties for a GUI object; other embodiments of the invention will use different properties with different names. The properties are divided into sections based on the application basis for each property.

General Properties:

abs_x; abs_y; all_items; attached_text; checked; class_name; column; date; enabled; focused; height; hwnd; items_count; line; nativeclass; object_class; position; regexpwndclass; regexpwndtitle; rightaligned; righttoleftlayout; righttoleftreading; statusbartex; selection; text; time; visible; width; window_id; windowextendedstyle; windowstyle; x; y;

Windows Properties:

foreground; hasborder; hascaption; hashscroll; hassizebox; hassystemenu; hasyscroll; hscrollpagesize; hscrollposition; is_child_window; is_owned_window; ismdichildwindow; ispopupwindow; istoolwindow; leftscrollbar; maxhscrollpos; maximizable; maximized; maxvscrollpos; minhscrollpos; minimizable; minimized; minvscrollpos; topmost; vscrollpagesize; vscrollposition; menuobjtype; menudetails;

ActiveX Properties:

progid; acx_name; caption; formattedtext; mask;

Visual Basic Properties:

vbname; vbname_path; vbparentname; scrollpagesize; scrollposition;

Web Properties:

application_version; alt; background_color; border; class; color; cols; coords; default_value; disabled; file_name; hasmenubar; hasstatusbar; hastoolbar; href; html_id; html_tag; image_type; innerhtml; innertext; kind; map_name; max_length; name; openedbytestingtool; opentitle; openurl; outerhtml; outertext; readonly; rows; scr; select_type; selected_item_index; selected_items_count; target; title; type; url; value; version; visible_items; width_in_characters;

Identification Properties:

IDProperty1; IDValue1; IDProperty2; IDValue2; IDProperty3; IDValue3; DCSClass_Action; DCSObjClass-Counter; SIEBEL; RepositoryName; SiebelObjType; GUIName; Last To create a test dataset from the master dataset, the master dataset is copied, and then the copied spreadsheet is edited to select and define an order for the rows (using the ReplayIndex column; the rows being selected by being provided with a ReplayIndex value, and ordered by the magnitude of the ReplayIndex value). In addition the columns containing the Test Function information are edited to define the test function to be associated with that row (and thus the GUI object).

A test function comprises one or more of: an action, a verification and a synchronization. These are well known to the skilled person, and have been described above. There is one column for each of "PerformAction", "PerformVerification" and "PerformSync" in the spreadsheet. The data in these columns can be edited, for example by including "True" into the "PerformAction" column to show that an action is to be performed. In addition, the Input, Output, SyncProperty, SyncValue and SyncTime columns can be edited to define the test function.

The way by which each test function is defined in the spreadsheet is specific to the GUI object. Nevertheless, in general terms the functions can be described as follows.

Perform Action

There are three main types of action which may be performed:

1—The performance of a single, unique, GUI object specific action—for example the clicking of a button or the checking of a checkbox.

2—A selection from a finite list of items—for example a selection of a menu item or the movement of a slide or scroll bar.

3—The inputting of text to the GUI object, or other similar unbounded action.

For single, unique, actions, it is sufficient to put "True" into the "PerformAction" column, since the action on that GUI object is unique.

For case 2, where there is a finite list of items, the master dataset provides a complete list of the possible items (or the range for a slide) in one of the object properties columns (such as the "all_items" column). In this case the correct option is selected from the list, and inserted into the "Input" column, along with putting "True" into the "PerformAction" column.

In the case of a text string or similar, the chosen text needs to be provided into the "Input" column, along with putting "True" into the "PerformAction" column.

Perform Verification

A verification comprises checking each property of the GUI object as stored in the spreadsheet against the properties of the GUI object in the AUT. When the master dataset is created, all available properties of the GUI object are extracted and stored in the relevant data record (i.e. row in the spreadsheet). To define a verification, the "PerformVerification" those properties which are not to be verified are removed from the row, and therefore only those properties which are to be verified in the test are left. These remaining properties may be edited. When the test is performed, each non-blank cell (i.e. the cells which were left) in the row is used as the basis for a comparison between the expected result (in the cell) and the corresponding property of the AUT object (actual result).

Perform Synchronization

A synchronization generally requires the test script to wait until an expected result occurs (such as a dialogue box, i.e. a new screen, appearing). When the master dataset is created, the SyncProperty, SyncValue and SyncTime columns are populated with appropriate values (which are object, i.e. row, specific). SyncProperty and SyncValue define the nature/identity and expected value of the property to be synchronized with; that is these columns define the synchronization test. In addition the SyncTime column defines a wait period or timeout during which the synchronization test is performed. If the synchronization test is true before the end of the wait period, then the test proceeds. If, however, the test remains false, then at the end of the wait period the test will return an error. Therefore, to specify that a synchronization is to occur, the PerformSync column is edited to read "True". In addition the SyncProperty, SyncValue and SyncTime columns can be edited.

An example of a spreadsheet containing a test dataset created for the Notepad application in accordance with the above description is shown below. The spreadsheet is, in this case, a table of 10 rows and 21 columns, however to fit on the page, the table has been split into three sections where each row (constituting a data record) continues across into the next table.

remains at the bottom of the table as an example. In addition, the number of object properties for each data record (i.e. columns) has been reduced for simplicity.

| Ordering Information | GUI Object Identity Information | | | | | |
|---|---|---|---|---|---|---|
| Replay Index | Owner Class | Owner Name | Parent Class | Parent Name | Object Class | Object Name |
| 1 | | | Window | Untitled - Notepad | | |
| 2 | | | Window | Untitled - Notepad | WinEditor | Edit |
| 3 | | | | | | Menu |
| 4 | Window | Untitled - Notepad | Dialog | Save As | | |
| 5 | Window | Untitled - Notepad | Dialog | Save As | WinEdit | File name: |
| 6 | Window | Untitled - Notepad | Dialog | Save As | WinButton | Save |
| 7 | | | Window | Untitled - Notepad | | |
| | Window | Untitled - Notepad | Dialog | Save As | WinComboBox | Save in: |

| Test Function Information | | | | | | | |
|---|---|---|---|---|---|---|---|
| Perform Action | Perform Verification | Perform Sync | Input | Output | Sync Property | Sync Value | Sync Time |
| NO | YES | NO | | | text | Untitled - Notepad | 10 |
| YES | NO | NO | This is a new text file to be written and saved. Hello world, this is a new text file being created. | | text | | 10 |
| YES | NO | NO | File; Save As . . . | | | | |
| NO | NO | YES | | | text | Save As | 10 |
| YES | NO | NO | HelloWorld.txt | | text | *.txt | 10 |
| YES | NO | NO | | | text | &Save | 10 |
| CLOSE | NO | NO | | | text | Untitled - Notepad | 10 |
| NO | NO | NO | | | selection | Desktop | 10 |

| Property Information | | | | | |
|---|---|---|---|---|---|
| all_items | attached_text | class_name | enabled | focused | text |
| | | | TRUE | | Untitled - Notepad |
| | | WinEditor | TRUE | TRUE | |
| File; New File; Open . . . File; Save File; Save As . . . File; Exit | | | | | |
| | | | TRUE | FALSE | Save As |
| | File &name: | WinEdit | TRUE | TRUE | *.txt |
| | | WinButton | TRUE | FALSE | &Save |
| | | | TRUE | FALSE | HelloWorld.txt - Notepad |
| History Desktop | | WinComboBox | TRUE | FALSE | |

As described above, the test dataset comprises those rows within the spreadsheet which have been provided with a ReplayIndex value; however the spreadsheet may contain other 'unused' rows. For simplicity most of these unused rows (data records) have been removed; however one unused row The first step of the test is a verification to check that the application is open, and that the AUT is at the desired starting point. In this example, this verification checks that the main window is being displayed. Accordingly, the row corresponding to the main window object has been provided with a "ReplayIndex" value of 1, the "PerformVerification" column contains "Yes", and a number of the "Property Information" columns contain data which is compared against the AUT. In this case, the verification checks whether the GUI object (the window) is enabled and is labelled "Untitled—Notepad". It will be noted that some of the "Property Information" columns are blank; this indicates that no check is to be made with respect of this object parameter. This may be because the object parameter does not exist for that GUI object.

The second step involves writing text into the main window of the Notepad application. Accordingly, the row corresponding to the "WinEditor" object in the main window of the Notepad application (this being the area in which a user types text) is provided with a ReplayIndex value of 2. The "PerformAction" column is set to "Yes" indicating that an action is to be performed on this object. In addition, the "Input" column contains the text which is to be inputted (as if a user had entered the text). The text in this case is "This is a new text file to be written and saved. Hello world, this is a new text file being created."

Having entered text the new file is saved, the first stage in which is to bring up the "Save As" dialogue box. Therefore, the row corresponding to the menu object is selected and ordered by being given a ReplayIndex value of 3. The test function is an action, and defined by the "PerformAction" column containing "Yes" and the "Input" column containing "File:Save As . . . " (indicating that the "Save As . . . " option in the "File" menu is to be selected). It will be noted that the "all_items" column contains the various options which may be selected using the menu object, in this case "File;New"; "File;Open . . . "; "File;Save"; "File;Save As . . . "; and "File;Exit"; and that the option "File;Save As . . . " has been selected and put into the "Input" column. (A number of other menu options, such as "Edit;Cut", "Edit;Copy" etc., have been removed for simplicity).

To allow the file to be saved, the notepad application displays the "Save As" dialogue box, which constitutes a new screen. The test script therefore synchronizes with the application; that is, the test script waits for the "Save As . . . " dialogue box to open. Accordingly, the row associated with the "Save As" dialogue box object itself is provided with the ReplayIndex of 4 and is edited to define that a synchronization is to occur with this object. To define this synchronization, the "PerformSync" column contains "Yes", and the "SyncProperty", "SyncValue" and "SyncTime" columns contain "text", "Save As" and "10" respectively, indicating that the test script should wait for 10 seconds until the dialogue box displays with the text "Save As".

Within the "Save As" dialogue box, two actions are performed, those of entering a name for the file and clicking the save button. As such, the row corresponding to the "File Name:" object is given the ReplayIndex value of 5. In this row (data record) the "PerformAction" column contains "Yes" indicating that an action is to be performed and the "Input" column contains "HelloWorld.txt" indicating the name of the file which is provided as an input to the "File Name:" object. The value of 6 in the ReplayIndex column is then applied to the row corresponding to the "Save" button, which has "Yes" in the "PerformAction" column. In the case of this button, there is only one action which may be performed on it, therefore, unlike the "File Name" object, an explicit input in the "Input" column is not required. However, this is not necessarily the case for all objects in the button classes.

Finally, the window, having been edited and saved, is closed. Therefore the final row of the test dataset, with ReplayIndex=7 is the row associated with the close button of the main window, which has "Close" in the "PerformAction" column accordingly.

The last row is an unused row, and as such does not contain a "ReplayIndex" value. This indicates that the row is not part of the test dataset, and therefore, when the test is run, the information in the row has no part to play in the test.

The test code is a series of computer instructions stored in, for example, a dynamic link library (.dll) file. The test code is machine readable and, when executed, will perform testing actions on the AUT. In some embodiments the test code is read and interpreted by an automation technology which performs the test action defined in the test dataset and test code. The test code contains programming instructions for each data record in the master dataset, the programming instructions containing references to the parameters in the data records of the master dataset. As described above, the data records from the master dataset are used as the basis for the data records of the test dataset; consequently, when a test is executed, the programming instructions reference the data records in the corresponding test dataset to perform object specific operations as described above. The test code may contain programming instructions created specifically for the data records in the master dataset; that is there is may be discrete blocks of code in the test code for each data record in the master dataset. Alternatively, the test code may be more generic, with a block of code provided for each class of object, or even for all classes of object. Whichever arrangement is used, the code follows the following generic pseudo-code:

```
If (object exists in AUT) Then
    If ("PerformVerification" flag is set) Then
        For each Property cell in Row
            If Property is Not Blank
                Check property
                Report success or failure
            End If
        Next
    End if
    If ("PerformAction" flag is set) Then
        If (GUI object is Enabled) Then
            Perform Action
            Synchronize action
            Report success or failure
        Else
            Report failure (GUI object not enabled)
        End If
    End If
    If ("PerformSync" flag is set) Then
        Synchronize
        Report success or failure
    End If
Else
    Report failure (object does not exist in AUT)
End If
```

Figure 3:
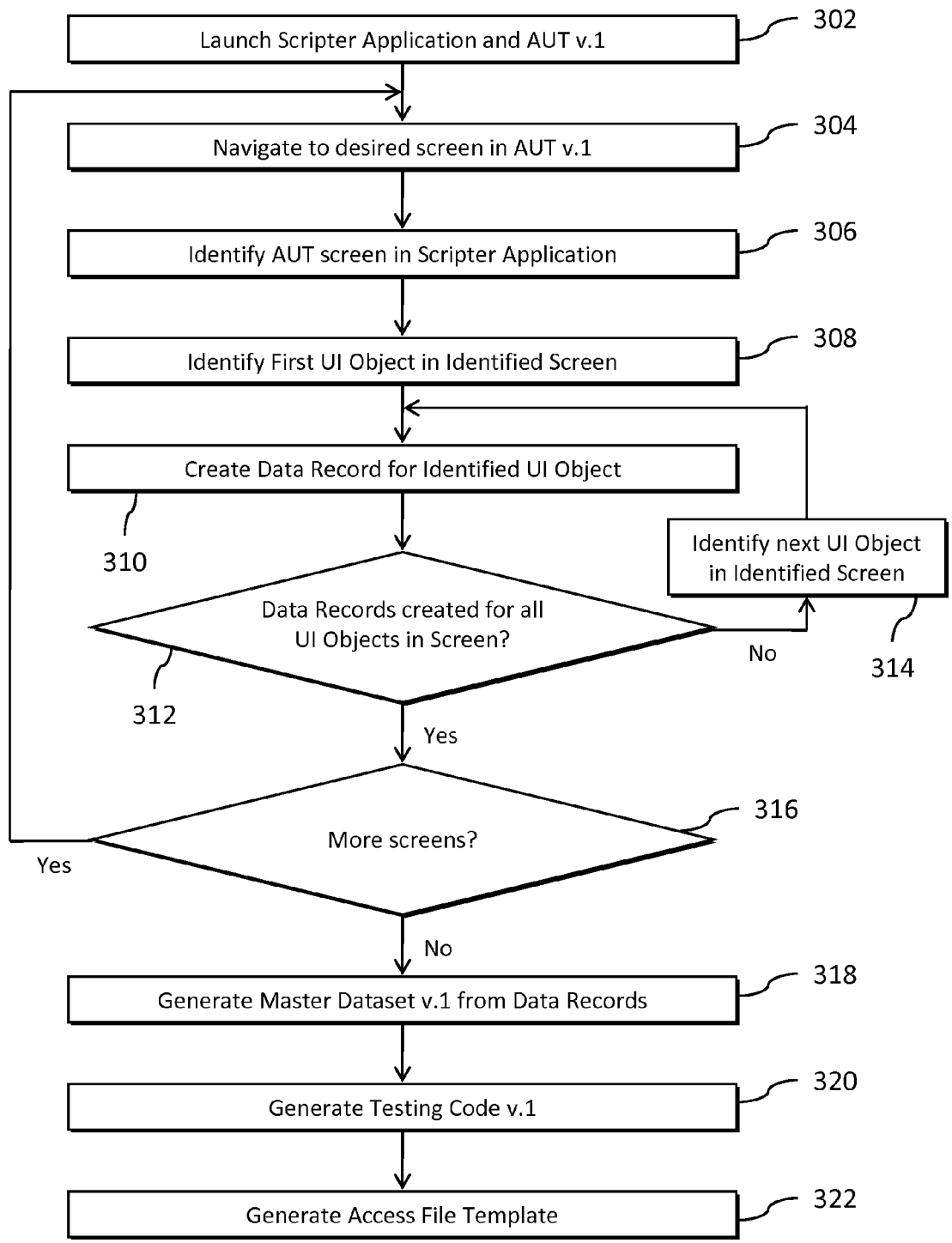
FIG. 3 shows a method for generating a master dataset according to an embodiment of the invention.
Figure 4A:
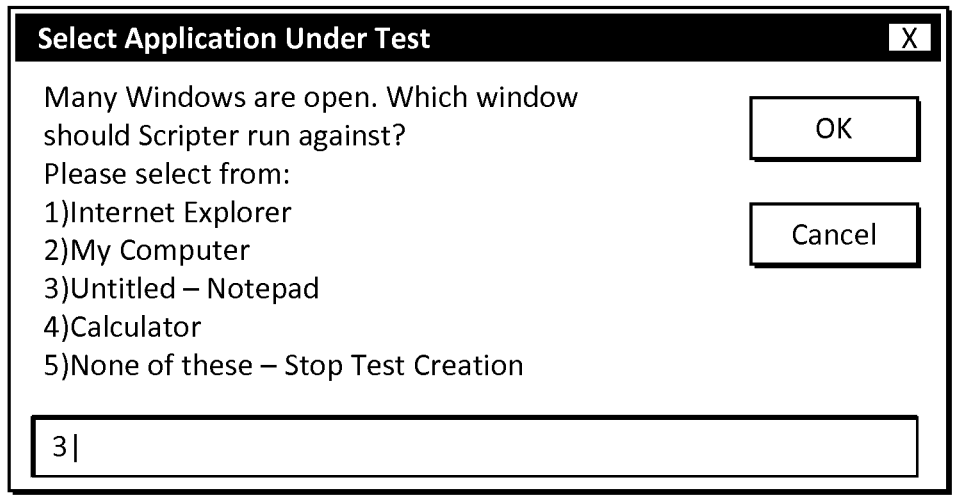
FIGS. 4a and 4b show examples of screens which are displayed by a scripting application according to an embodiment of the invention.
Figure 4B:
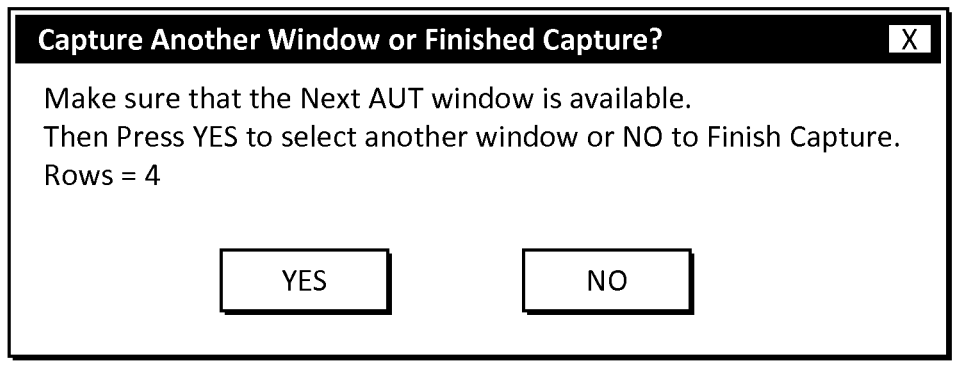

A method by which a master dataset is created according to an embodiment of the invention will now be described with reference to FIGS. 3, 4a and 4b. In FIG. 3, it is assumed that the first version of the application to be tested is version 1 (v.1). However this may not necessarily be the case.

First, in step 302, a scripter application in accordance with embodiments of the invention is launched, followed by an instance of the application under test (AUT) being launched. The AUT, when run on the computer system 100 causes a screen (as described above) to be displayed. For example, the Notepad application when first opened will display the main window, described in FIG. 2a.

In step 304 the desired screen of the AUT is navigated to. In the first instance, if the first screen is to be the main window, this may not require any further input. However in subsequent iterations, input may be provided to the AUT to make the AUT display a desired screen (for example, using the menu to select "Save as" to bring up the "Save as" dialogue box).

In step 306, input is provided identifying the desired screen to the scripter application. To enable this, the scripter application may display a window such as that show in FIG. 4a, which provides a list of all open windows (in this case "Internet Explorer", "My Computer", "Untitled—Notepad", "Calculator"). The window may also provide a "none of the above" option, which allows the test creation process to be ended. The tester may then type in the number corresponding to the desired screen, and click "OK", at which point the identity of the screen corresponding to the inputted number is used as the "desired screen" in the subsequent steps.

In steps 308, 310, 312 and 314 the scripter application identifies and creates a data record for each user interface (GUI) object within the identified screen. This may be done using an index counter, wherein each object has a unique index and the scripter application identifies the total number of GUI objects in the screen, and iterates through this index until the index equals the total number of GUI objects.

Other methods may be used. In the example described herein, the scripter application, in step 308, identifies a first GUI object in the screen identified in step 306. In step 310, the scripter application then creates a data record for the identified GUI object by extracting the properties of the GUI object and storing them in a suitable format. In step 312, a test is performed as to whether all GUI objects in the identified screen have had their properties identified and a corresponding data record created for them. In step 314, if the test shows that there are GUI objects for which a data record has not been created, the next GUI object is identified and the method returns to step 310 where the objects for the GUI object are identified and used to create a data record.

If, in step 312, it is determined that all GUI objects have had their properties extracted and a data record has been created for them, then the method proceeds to step 316.

In step 316 a further input is provided to identify whether all screens have been analysed, or whether there are more screens to analyse (that is have data records created for the GUI objects therein). In one embodiment, the tester is presented with a dialogue box such as that shown in FIG. 4b, in which the tester can choose to select a new screen for data record creation, or to identify that all screens of the AUT have been analysed and the process can continue. If screens remain, the tester will navigate to the next desired screen of the AUT, and then select "Yes". At this point a further dialogue box, such as that shown in FIG. 4a may be shown, in which the tester can identify this next desired screen.

If "Yes" is selected in step 316, the method returns to step 304 in which, as described above, the tester navigates to the desired screen. If "No" is selected in step 316, the method proceeds to step 318 in which the scripter application creates the master dataset v.1. Having created the master dataset v.1, the scripter application, in step 320, additionally creates corresponding test code v.1 based on the master dataset v.1 and, in step 322, an access file template.

Figure 5:
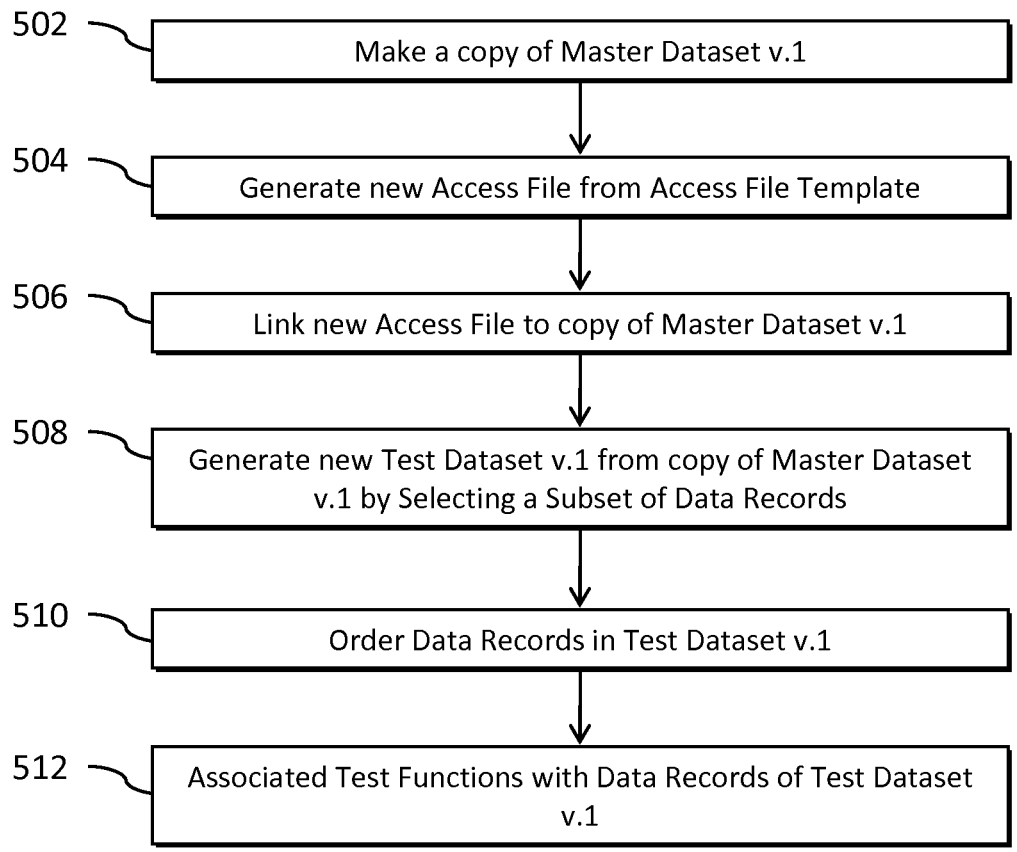
FIG. 5 shows a method for generating a test dataset according to an embodiment of the invention.

With reference to FIG. 5, a method by which an automated application test is created using the master dataset, test code file and access file template will be described.

In step 502 a copy of the master dataset is created. As described above, in this example the master dataset is a spreadsheet, therefore this copying creates a new spreadsheet file.

In step 504 a new access file is created from the access file template by copying the access file template.

In step 506 the new access file and the copy of the master dataset are linked together. In this embodiment this is done by naming the two files so that they are associated, for example "Test A" for the access file, and "Test A v.1.xls" for the spreadsheet. As described above the access file is version independent and therefore does not include a version number.

In steps 508 to 512 the copy of the master dataset v.1 edited to create a test. This editing involves, in step 508, selecting a subset of the data records in the copy of the master dataset v.1 and, in step 510, defining an order for this subset. As described above, this is done by providing the rows for the desired subset with a unique index number in the "ReplayIndex" column. The spreadsheet so created therefore comprises an ordered set of rows (data records) and may additionally comprise a number of unused/unwanted rows. Thus the spreadsheet may comprise the test dataset (the selected rows) and the additional rows.

Finally in step 512 one or more test functions are associated with each row in the subset. This may be done by editing the "PerformAction", "PerformVerification", "PerformSync", Input, Output, SyncProperty, SyncValue and SyncTime columns as described above.

Each row in the final ordered subset corresponds to an object and defines a testing function to be performed with that object. The testing functions are executed in the order defined by the ordering information of the subset.

A method by which the master dataset for a second version of the AUT can be created will now be described. The following example is for v.2 of the AUT, however it will be recognized that the same method is applicable for any subsequent versions of the AUT. As described above, the AUT is modified in respect of one or more screens and/or GUI objects within the screens. When these modifications are written into the AUT by the programmer/programming team, there will be a record of the changes made, that is there will be a record of screens containing new or modified objects. This record is used in the method below to identify the screens relevant to the modifications.

Figure 6:
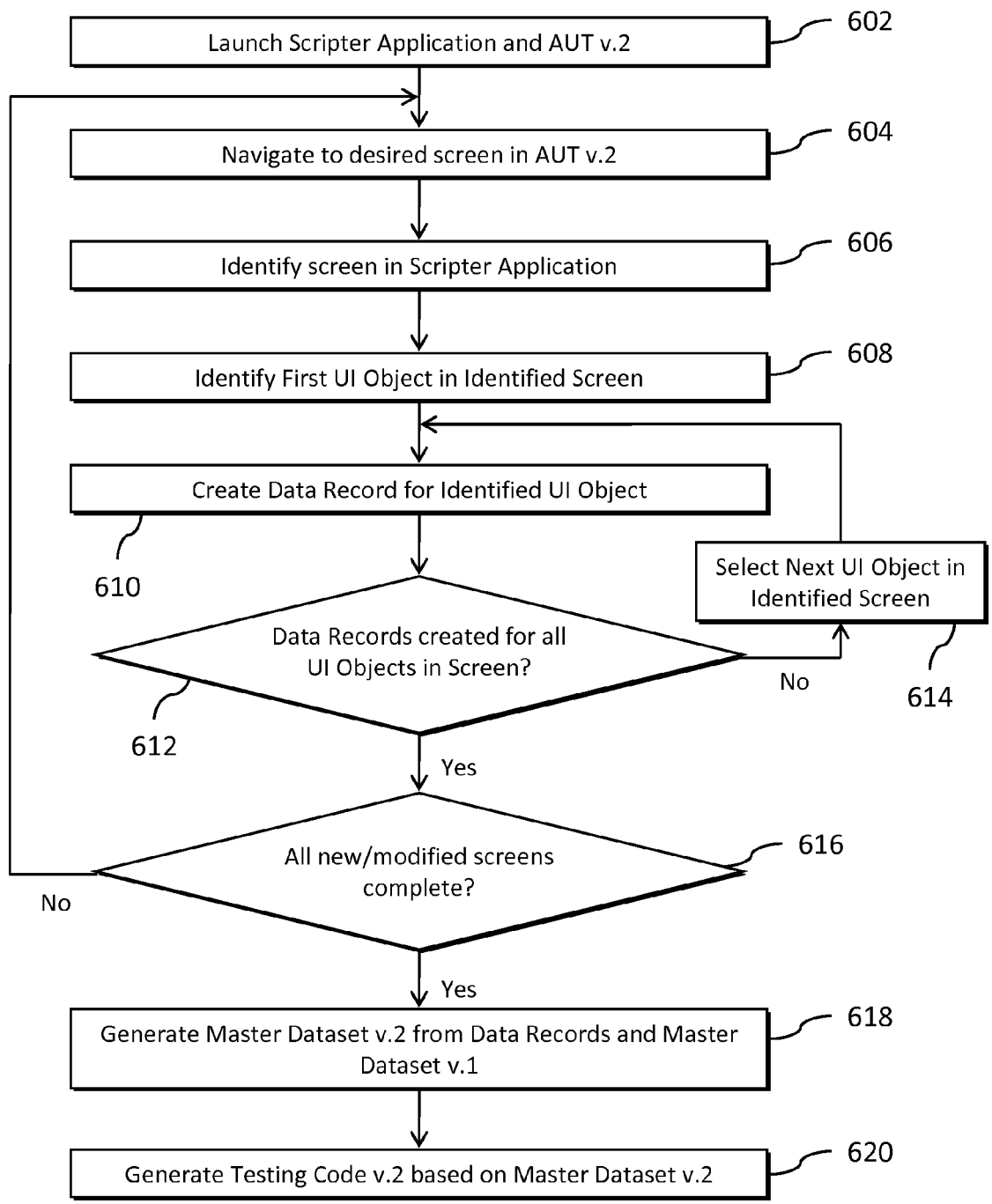
FIG. 6 shows a method for generating a master dataset for a modified version of a front end application according to an embodiment of the invention.

With reference to FIG. 6, in step 602, the new version (v.2) of the AUT and the scripter application are both launched. This is in a similar manner to step 302 of FIG. 3.

In step 604 the desired screen is navigated to. Since the screens comprising modifications are known, the tester is able to easily identify these modified screens. In step 606 the tester identifies the screen to the scripter application in a similar manner to step 306 of FIG. 3.

When a screen is identified, the scripter application, in steps 608 to 614 identifies the properties of all the objects in this screen, and created corresponding data records for these objects. The process is the same as in steps 308 to 314 of FIG. 3.

Having created data records for all the GUI objects in the screen, the scripter determines whether there are any further modified screens. This may be via a dialogue box such as the one shown in FIG. 2b. If there are further modified screens remaining, the method returns to step 604 where the screen is identified and the properties of the GUI objects identified.

When all modified screens have been analysed, the method proceeds to step 618 in which master dataset v.2 is created. Since new data records have only been created for the modified objects/screens, the master dataset v.2 is created by adding the new data records to the master dataset corresponding to the previous version; in this example this being master dataset v.1.

In addition, in step 620, the test code is updated to contain code corresponding to the objects in master dataset v.2. This may involve creating a new test code file, associated with v.2 of the AUT.

Having created master dataset v.2, the test datasets created for the application are updated to be effective with the v.2 of the AUT. First, it may be determined which test datasets need to be updated for the new version of the AUT. That is, the test datasets containing data records corresponding to modified GUI objects are selected. Subsequently, copies of the selected test datasets are made, and renamed to reflect the new versions (for example "Test A v.1.xls" is copied and the copy is named "Test A v.2.xls"). Then the new data records (those associated with the modifications to the AUT) in master dataset v.2 are copied into the v.2 versions of the test datasets. The v.2 test datasets are then edited in a similar manner to that described in relation to steps 510 and 512 of FIG. 5; that is the new data records are included in to the dataset order (by being provided with a ReplayIndex), and test functions are included for these new data records (rows). During this process, some of the original data records from the v.1 test dataset may be removed by removing the value from the ReplayIndex column.

In addition, new test datasets may be created for the new version of the AUT. That is, the new test datasets may not be based on any existing test dataset. The new test datasets may be created to test new features of the new version of the AUT, but this is not a requirement (for example, time and/or cost constraints may mean that not every desired test was created for the previous version of the AUT).

Figure 7:
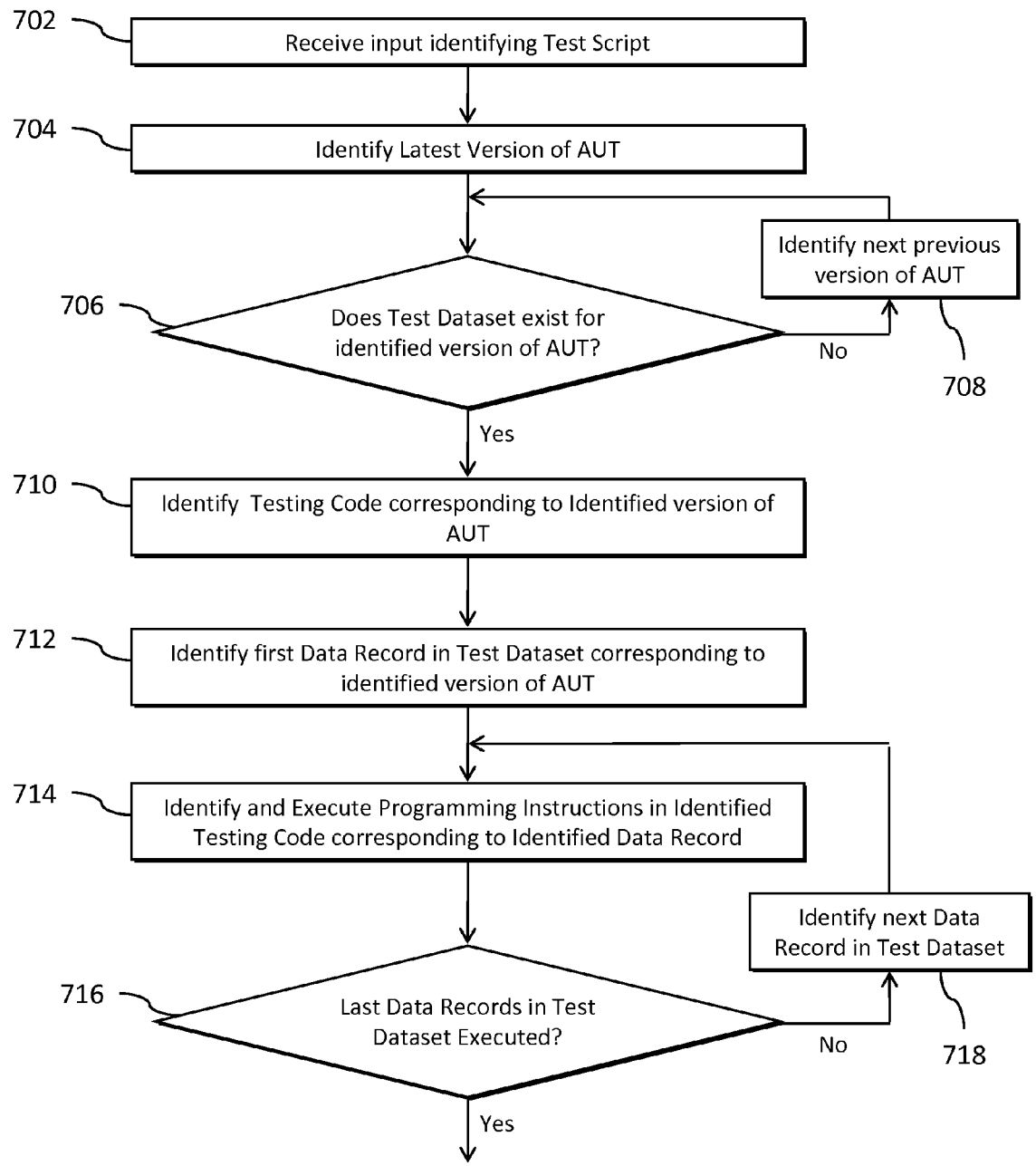
FIG. 7 shows a method for running an automated test according to an embodiment of the invention.

A process by which a test created using the system above is executed will now be described with reference to FIG. 7. In a first step 702, a particular test is chosen (for example Test A). The selection of a test may be made by a tester selecting a test in a list, for example opening the "Test A" access file using the windows explorer.

In steps 704 to 708 the latest version of the AUT for which a test exists is determined, irrespective of the number of versions of the AUT. To give an example, if there are 3 versions of the AUT (v.1, v.2 and v.3), but test datasets for only v.1 and v.2, when the test script is executed, the dataset v.2 would be used (since it is the latest version available). In other words step 704 involves a determination of the latest version of the AUT (i.e. v.3); then in step 706, a determination is made as to whether a test dataset exists for that version. If, as in this example, no test dataset exists for v.3, then the next previous version of the AUT is identified in step 708 (i.e. v.2) and the determination in step 706 is repeated for that version.

When a test dataset is found, the method proceeds to step 710 where the test code associated with the version of the selected test dataset is identified to use as code for the test.

In step 712, the first data record in the test dataset is identified; typically this will be the data record with the lowest "ReplayIndex" (i.e. 1). Then in step 714 the portion of the test code corresponding to the identified data record is retrieved and the programming instructions in that portion are executed. The programming instructions reference the contents of the data record so as to derive what test function is to be performed, and what parameters are to be used.

Steps 714, 716 and 718 form a loop such that, having executed the programming instructions corresponding to the first data record, the subsequent data records are all executed in order. That is, in step 716, it is determined if any more data records exist in the subset, and if there are any further data records, in step 718, the next (i.e. index 1 goes to index 2, 2 to 3 etc. . . . ) data record is identified and the corresponding test code is executed.

The process ends when all the test functions associated with the subset of data records have been executed in order.

Additional Details and Modifications

In the above embodiments, the ordering and selection is performed using a value in the "ReplayIndex" column. As an alternative, the spreadsheet comprising the test dataset may be edited to remove unwanted rows, for example by removing any row which is not part of the selected subset. In addition, the remaining rows may be re-ordered within the spreadsheet to define the order for the rows (data records). As such, the test dataset will contain all the rows that exist in the spreadsheet. In such a situation, the spreadsheet may be provided with an indication as to whether the ReplayIndex or the row order is to be used to define the order of the records in the test dataset. This indication may be provided in a column, for example a "UseReplayIndex" column.

A spreadsheet, defining a test dataset, may be converted between the two options. For example, once a test has been finalized, the spreadsheet may be 'streamlined' by converting from using the ReplayIndex to using the row number. In other words, the unused rows (which may be identified by the absence of a ReplayIndex identifier) are deleted and the rows comprising the test dataset are sorted into the order defined by the ReplayIndex.

When a spreadsheet using the row order is updated to reflect the modifications in a new version of an AUT, then the process of updating may include steps of setting the "UseReplayIndex" column to indicate that the ReplayIndex is to be used and providing each row of the original spreadsheet with a ReplayIndex value according to their row number. These steps would be performed before the spreadsheet is updated with the new data records for the new version of the AUT. Consequently, the new rows (data records) from the modified AUT will exist in the spreadsheet, but will not form a part of the test dataset (being without ReplayIndex values). Having completed these steps the new rows may be included into the test dataset by providing the rows with ReplayIndex values.

When a master dataset is created for a later version of the AUT, a further step may be included in which each new data record created for the later version of the AUT is compared against the existing data records of the AUT. If the data record already exists (that is the data record corresponds to a GUI object which has not been modified) then the new data record may be discarded, and therefore a duplicate data record will not included into the master dataset for the new version (the data record will already be present since the new version's master dataset is based on the older version's master dataset). Alternatively or additionally, a more complex comparison may be performed, in which it is determined whether or not a GUI object has been modified, and the data record corresponding to the old GUI object is replaced by the new one.

In the above embodiments, the access file is a file which can be selected to run a test. In alternative embodiments, the access file may be replaced by a list, from which a tester may select the desired test. The list may be combined with a lookup table from which the correct test dataset and test code are selected.

The access file is described as automatically selecting the latest available version of the test dataset and corresponding test code file. However in other embodiments the access file may be designed to determine a version of the AUT for which a test is to be run, and to run the appropriate test. This determination may be automatic, or performed with user input.

In the above embodiments, the master dataset and the test dataset are specified in a spreadsheet. However, in other embodiments of the invention the datasets may be database tables, text files, or any other appropriate file. Equally, the test code file is not limited to being a DLL file, and may be of any type appropriate to containing computer programming instructions as described above.

The arrangement of data records may be such that the test dataset contains only references to the data records in the master dataset so as to define the subset, order and test functions. As such the master dataset may not be copied to create a new test dataset, but rather a test dataset may be a new file, which simply references data records of the master dataset.

In the above embodiments, only one test function is described as being associated with a row; however it is envisaged that more than one test function can be associated with a given row (data record), for example an action may be followed by a synchronization.

When defining the test dataset, it is possible that one or more rows (data records) are to be used to define test functions in more than one occurrence in the test. Should this be required, the row in question may be duplicated within the test dataset spreadsheet, the duplicated row edited to provide a test function, and the duplicated row ordered within the test dataset in the usual manner.

In the above described embodiments, the test function is defined by including "True" into the appropriate column (PerformAction, PerformVerification, PerformSync). In alternative embodiments other indicia may be used in the place of "True" such as "1", "Yes", or truncations such as "T", "TR" etc. . . .

In some embodiments of the invention, additional parameters may be stored, either as first data record or as a header to the test dataset, or as a part of the access file. These additional parameters may define, for example, whether an instance of the AUT is to be launched prior to the test being performed, and if so, the address of the AUT such that the AUT can be identified. This initialization step may also include a verification and/or a synchronization to ensure the AUT is presenting the desired starting screen before the testing steps are performed.

A further advantage of the invention is that existing tests can be easily modified to create new tests. For example, an existing test dataset (e.g. Test A v.2.xls) can be copied and modified to create a new test (e.g. Test A2 v.2.xls). This new test (Test A2) can contain all (or some) of the testing steps defined in the old test (Test A); however, the new test dataset can also contain additional data records and thus define additional testing actions. This has particular advantages when a series of steps are common across a large number of tests, but when each test is slightly different in one or more additional steps. In this case, a test dataset can be created to define the common steps, and then copied and edited to define each individual test.

When the ReplayIndex is used in the spreadsheets described above, the new/additional test functions are easily added to the test dataset, since the unused data records are already present in the spreadsheet (only they do not have a ReplayIndex value, and therefore are not in the subset of data records which makes up the test dataset). Consequently, the appropriate rows need only be provided with a ReplayIndex value to be included into the test dataset.

In some embodiments of the invention, the process of identifying screens may be automated. For example, information may be provided, prior to the method described in FIG. 3 above, which identifies each screen for which data records are to be created for GUI objects. This data may then be used to control the AUT to cause the AUT to display each screen in turn, and then to identify the screen to the scripter application as described in step 306 of FIG. 3.

In some embodiments, when a later version of the AUT is to be analysed, this information may be provided in a manner similar to creating a test; that is, a pseudo test is created to open each screen in turn so that it can be analysed. It will be apparent that the use of such a pseudo test requires the modifications between the versions of the application to be such that they do not affect the opening and closing of screens. However, in a number of cases this will be the case, in particular since many screens only require the close button object to be present to be compatible with such a process.

Alternatively, the scripting application may record the actions required to display each screen of the AUT, and when a new version of the AUT is provided, these actions are replayed, and data records created for the objects within the screens thereby displayed.

In some embodiments, every time the AUT is modified (and a corresponding master dataset created), all existing spreadsheets comprising test datasets are updated (that is the spreadsheet is copied, renamed and has the new version data records added). However, the new data records (rows) may not be provided with "ReplayIndex" values, and therefore are not included into the new test dataset so created. In other words, test datasets may be replicated for each version of the application, and some of the test datasets may be the same for multiple versions. In addition, in this embodiment, it may not be necessary to determine the latest version of the application for which has a test dataset has been created since all versions of the application will have a test dataset by definition.

The examples of object properties described above are for Windows based applications (C, C# etc), web based applications (HTML), Visual Basic and ActiveX applications. However, the invention is not necessarily limited to such applications and object properties may be included for e.g.: Java; SAP; SIEBEL; etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer implemented method of generating a test script template for a computer program, the computer program comprising a set of instructions which, when executed on a computer, causes the computer to display a user interface comprising a set of screens, each screen of the set of screens comprising user interface objects, the method comprising:

receiving a plurality of input, each input identifying one screen of the set of screens;

automatically generating a first master set of data records, the first master set of data records comprising a spreadsheet of data records corresponding to respective user interface objects associated with each screen in the identified set of screens, and each data record comprising parameters associated with the respective user interface object;

creating a test script template comprising the first master set of data records, wherein the test script template is a copy of the first master set of data records;

selecting a subset of data records from the test script template;

defining an order for the data records of the subset;

associating at least one test function with each of the data records of the subset, whereby to create a test dataset from the ordered subset and the associated test functions, wherein:
for one or more data records of the subset the associating comprises:
associating a verification function with the data record; and
selecting one or more of the parameters of the data record, the one or more of the parameters identifying one or more properties of the user interface object corresponding to the data record, which are to be verified; and
for one or more data records of the subset the associating comprises associating a synchronization function with the data record, and defining at least one parameter to be used in the synchronization at the time for the synchronization; and
creating a test script from said test script template, the test script comprising information identifying the test dataset and a set of programming instructions, wherein the set of programming instructions are associated with each of the data subset, and reference the parameters of the data records and the test functions associated with the data records.

2. The computer implemented method of claim 1, wherein each one of the set of screens comprises a user interface object comprising parameters of the screen.

3. The computer implemented method of claim 1, wherein the first master set of data records comprises one data record for each user interface object associated with each screen of the set of screens.

4. The computer implemented method of claim 1, comprising receiving a plurality of inputs, each input identifying one screen of the set of screens; and in response to each input automatically generating data records for each of the plurality of user interface objects associated with the screen identified in the input.

5. The computer implemented method of claim 4, comprising providing input to the computer program whereby to cause the computer program to display the plurality of screens.

6. The computer implemented method of claim 1, wherein the computer program is a first version of an application and the first version is modified to create a second version thereof, the second version comprising at least one modification when compared to the first version, the method comprising:
receiving data identifying one or more screens, the one or more screens comprising the at least one modification;
generating at least one further data record for at least one user interface object of the one or more identified screens; and
modifying the first master set of data records by combining the at least one further data record with one or more of the data records of the first master set of data records.

7. The computer implemented method of claim 6, wherein the generating at least one further data record comprises generating a data record for each user interface object of the identified one or more screens.

8. The computer implemented method of claim 6, wherein the at least one modification comprises at least one of:
an additional screen;
removal of a screen from the set of screens; an additional user interface object associated with a screen;
removal of a user interface object from the set of GUI objects associated with a screen; and
a modified user interface object associated with a screen.

9. The computer implemented method of claim 1, wherein the test function comprises one or more of: an action, a verification and a synchronization.

10. The method of claim 9, wherein the test function is defined by one or more of:
information identifying an action to be performed;
information identifying an expected property to be verified;
synchronization property;
a synchronization value; and
a synchronization timeout.

11. The computer implemented method of claim 1, wherein the data records of the first master set of data records comprise information identifying a plurality of functions associated with the respective user interface object, and the associating at least one test function with a data record comprises selecting one of the plurality of functions and associating said selected function with the data record.

12. The computer implemented method of claim 1, comprising modifying the parameters of at least one of the data records whereby to create the test dataset.

13. The computer implemented method of claim 1, wherein the computer program is a first version and the first version is modified to create a second version, the second version comprising at least one modification when compared to the first version, the method comprising:
selecting at least one data record from a second set of data records associated with the second version;
creating a second test dataset associated with the second version, the second test dataset being created by modifying the test dataset associated with the first version to include the at least one selected data record.

14. The computer implemented method of claim 13, wherein the creating a second test dataset comprises modifying the test dataset associated with the first version to remove at least one data record.

15. The computer implemented method of claim 13, wherein modifying the test dataset associated with the first version is dependent on a determining that the test dataset associated with the first version comprises one or more data records associated with the at least one modification.

16. The computer implemented method of claim 13, wherein the computer program comprises a plurality of versions, each version being a modification of a previous version, and wherein a test dataset is created for a version of the computer program if a test dataset associated with a previous version comprises a data record associated with a modification from the previous version.

17. A non-transitory computer readable storage medium storing computer readable instructions thereon for execution on a computing system to implement a method of generating a test script template for a computer program, the computer program comprising a set of instructions which, when executed on a computer, causes the computer to perform a method to display a user interface comprising a set of screens, each screen of the set of screens comprising user interface objects, the method comprising:
receiving a plurality of input, each input identifying one screen of the set of screens;
automatically generating a first master set of data records, the first master set of data records comprising a spreadsheet of data records corresponding to respective user interface objects associated with each screen in the identified set of screens, and each data record comprising parameters associated with the respective user interface object;

creating a test script template comprising the first master set of data records, wherein the test script template is a copy of the first master set of data records;
receiving user input selecting a subset of data records from the test script template;
receiving user input defining an order for the data records of the subset;
receiving user input associating at least one test function with each of the data records of the subset whereby to create a test dataset from the ordered subset and the associated test function, wherein:
  for one or more data records of the subset the associating comprises: associating a verification function with the data record; and
  selecting one or more of the parameters of the data record, the one or more of the parameters identifying one or more properties, of the user interface object corresponding to the data record, which are to be verified; and
  for one or more data records of the subset the associating comprises associating a synchronization function with the data record, and defining at least one parameter to be used in the synchronization and a time for the synchronization; and
creating a test script from said test script template, the test script comprising information identifying the test dataset and a set of programming instructions, wherein the set of programming instructions are associated with each of the data records of the subset, and reference the parameters of the data records and the test functions associated with the data records.

18. A system for generating a test script template for a computer program, the computer program comprising a set of instructions which, when executed on a computer, causes the computer to display a user interface comprising a set of screens, each screen of the set of screens comprising user interface objects, the system comprising a processor coupled to a memory, the system configured to:
  receive a plurality of input, each input identifying one screen of the set of screens;
  automatically generate a first master set of data records, the first master set of data records comprising a spreadsheet of data records corresponding to respective user interface objects associated with each screen in the identified set of screens, and each data record comprising parameters associated with the respective user interface object;
  create a test script template comprising the first master set of data records, wherein the test script template is a copy of the first master set of data records;
  receive input, the input identifying a subset of data records from the test script template, defining an order for the data records of the subset, and identifying at least one test function to be associated with each of the data records of the subset whereby to create a test dataset from the ordered subset and the associated test functions, wherein:
    for one or more data records of the subset the associating comprises;
    associating a verification function with the data record; and
    selecting one or more of the parameters of the data record, the one or more of the parameters identifying one or more properties of the user interface object corresponding to the data record, which are to be verified; and
    for one or more data records of the subset the associating comprises associating a synchronization function with the data record, and defining at least one parameter to be used in the synchronization and a time for the synchronization;
  create a test script from said test script template, the test script comprising information identifying the test dataset and a set of programming instructions, wherein the set of programming instructions are associated with each of the data subset, and reference the parameters of the data records and the test function associated with the data records.

* * * * *